(12) United States Patent
Bawa (10) Patent No.: US 9,256,444 B2
(45) Date of Patent: Feb. 9, 2016

(54) APPLICATION LEVEL INTEGRATION IN SUPPORT OF A DISTRIBUTED NETWORK MANAGEMENT AND SERVICE PROVISIONING SOLUTION

(75) Inventor: Satvinder Singh Bawa, Ottawa (CA)

(73) Assignee: Alcatel Lucent, Boulogne-Billancourt (FR)

(*) Notice: Subject to any disclaimer, the term of this patent is extended or adjusted under 35 U.S.C. 154(b) by 1655 days.

(21) Appl. No.: 12/193,243

(22) Filed: Aug. 18, 2008

(65) Prior Publication Data
US 2009/0013176 A1  Jan. 8, 2009

Related U.S. Application Data

(62) Division of application No. 10/112,728, filed on Apr. 2, 2002, now abandoned.

(51) Int. Cl.
*G06F 9/44* (2006.01)
*H04L 12/24* (2006.01)
*H04L 12/26* (2006.01)

(52) U.S. Cl.
CPC ............ *G06F 9/4443* (2013.01); *H04L 41/22* (2013.01); *H04L 41/5012* (2013.01); *H04L 41/5096* (2013.01); *H04L 43/0817* (2013.01)

(58) Field of Classification Search
USPC .......... 715/734, 735, 736, 771; 719/328, 223, 719/224; 726/6, 27; 709/222, 223, 219, 221
See application file for complete search history.

(56) References Cited

U.S. PATENT DOCUMENTS

| | | | |
|---|---|---|---|
| 6,493,751 B1* | 12/2002 | Tate et al. | 709/221 |
| 6,687,873 B1* | 2/2004 | Ballantyne et al. | 715/215 |
| 6,738,811 B1* | 5/2004 | Liang | 709/224 |
| 6,807,580 B2* | 10/2004 | Freeman et al. | 709/249 |
| 6,983,317 B1* | 1/2006 | Bishop et al. | 709/223 |
| 7,289,964 B1* | 10/2007 | Bowman-Amuah | 705/1.1 |
| 2003/0009543 A1* | 1/2003 | Gupta | 709/223 |
| 2003/0031164 A1* | 2/2003 | Nabkel et al. | 370/352 |

* cited by examiner

Primary Examiner — Thanh Vu
(74) Attorney, Agent, or Firm — Marks & Clerk (57) ABSTRACT

An integrated data network management and data service provisioning environment is provided. The integrated environment includes legacy software application code and current software application code each augmented with code portions enabling exchange of information therebetween via an interworking layer. A facility for participation in and interacting with the integrated environment is also provided. A man-machine interface is integrated across different applications which themselves may be executed on different computers to provide a seamless exchange of information. The advantages are derived from enhanced usage efficiencies in providing data network management and service provisioning solutions. The interworking layer also provides for security enforcement across applications participating in the integrated environment.

15 Claims, 6 Drawing Sheets

APPLICATION LEVEL INTEGRATION IN SUPPORT OF A DISTRIBUTED NETWORK MANAGEMENT AND SERVICE PROVISIONING SOLUTION

FIELD OF THE INVENTION

The invention relates to data network management and data service provisioning environments, and in particular to methods of using network management and service provisioning applications in combination to provide network management and service provisioning solutions.

BACKGROUND OF THE INVENTION

In the field of data network management and service provisioning, software applications running on and hardware associated with computing platforms such as workstations, computers, terminals, etc. are used in combination to provide network management and service provisioning solutions.

Figure 1:
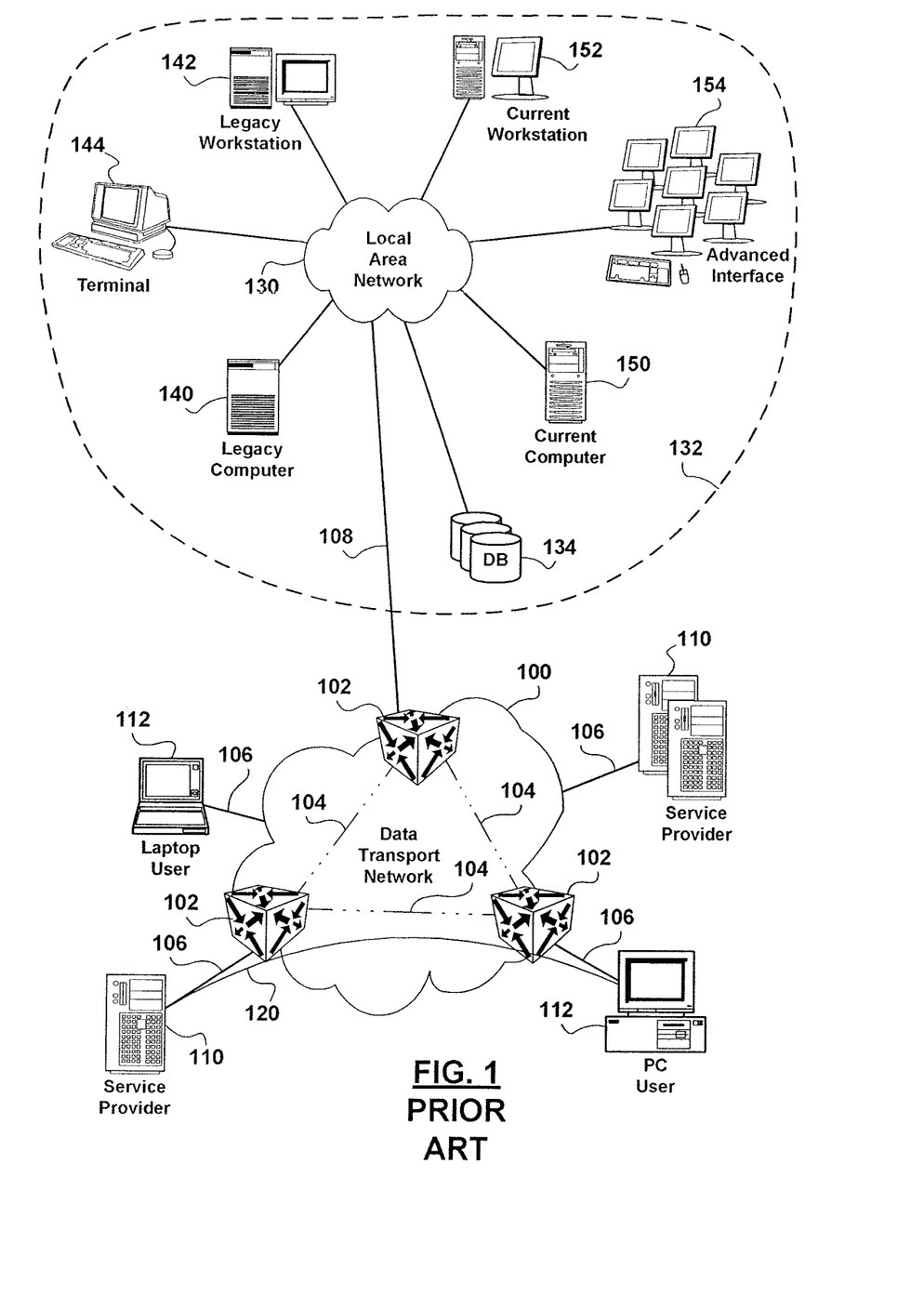
FIG. 1 is a schematic diagram showing data network elements participating in a data transport network and data network elements used in an associated data network management and data service provisioning environment.

FIG. 1 is a schematic diagram showing data network elements participating in a data transport network and data network elements used in an associated data network management and data service provisioning environment.

A data transport network 100 includes data network nodes such as, but not limited to, data switching nodes 102, and interconnecting data transport links 104. The data transport network 100 enables the conveyance of data between data network nodes associated with service providers 110 and data network nodes associated with service users 112. Both service provider 110 and the service user 112 data network nodes are said to be connected to the data transport network 100 via data transport uplinks 106 to enable the conveyance of data therebetween.

Although only data switching nodes 102 are shown in FIG. 1, the invention is not limited thereto; data transport networks may also include a large variety of data network elements (not shown) such as: routers, bridges, Domain Name Service (DNS) servers, firewalls, multiplexers, demultiplexers, etc.

A data connection 120 presented in FIG. 1 is shown to provision a data service during a corresponding data session between a service provider 110 and a service user 112.

An uplink 108 connects a data network Management Local Area Network (MLAN) 130 to the data transport network 100. The MLAN 130 services a network management and service provisioning hub 132 comprising computing platforms such as legacy computer 140, legacy workstation 142, terminal 144, current computer 150, current workstation 152, advanced interface 154, etc.

Computing platforms in existence include: legacy, current, state-of-the-art, etc. Factors considered in the above classification include: age, capabilities, length of operation, costs of operation, current stage of the development cycle, etc. When reference is made herein to a computer, the computer is understood to include at least one processor and optionally a human-machine interface. When reference is made to a terminal, the terminal is understood to include a computer having limited data processing capabilities but typically used for its human-machine interface capabilities.

Ancillary MLAN connected data network nodes enabling network management and service provisioning include but are not limited to a database 134. The management hub 132 may make use of other MLAN connected data network nodes or devices (not shown) such as DNS servers, relational databases, firewalls, etc.

As part of the network management and service provisioning it may be necessary to employ: monitoring equipment, statistics gathering equipment, statistics processing equipment, storage equipment, statistical information storage database, etc. These devices may be connected to the data transport network 100 directly. All of these devices although not shown, can either form an integral part of data network nodes or may exist as distinct data network nodes themselves.

At least one command and control interface including an output display interface and an input interface is necessary for an analyst to view and interact with a current state of at least a portion of a managed data transport network and/or at least a portion of provided services.

In the field, new data services are being demanded by market drivers resulting in a constant development thereof. Existing services are being extended. At the same time new data network equipment is being developed. The result is that a large body of software application code for network management and service provisioning has been and is being developed. This body of software application code today is regarded as being categorized into legacy software application code and current software application code.

Legacy software application code typically has been developed and deployed some time ago. Legacy software application code typically was designed for and typically runs on legacy computers, and in some ways is closely related to the state-of-the-art at the time of development.

Typically the legacy computers running legacy software application code are no longer sold, no longer maintained and/or supported actively. Another important factor regarding legacy software application code relates to original developer personnel who have been assigned to other projects. All these factors compound resulting in increased costs for supporting legacy software application code curtailing further development thereof.

Current software application code is characterized as having been developed rather recently with some features still being developed, fine tuned and maintained. The current software application code is typically engineered to run on current computers that are available on the market, are still actively maintained and supported.

Therefore in providing a network management and service provisioning solution there are a number of features and advantages that must be taken into consideration. Current computers typically have superior capabilities in comparison to legacy computers. Although considered relatively old, legacy computers include special purpose computers. Computer hardware cost is another factor.

Figure 2:
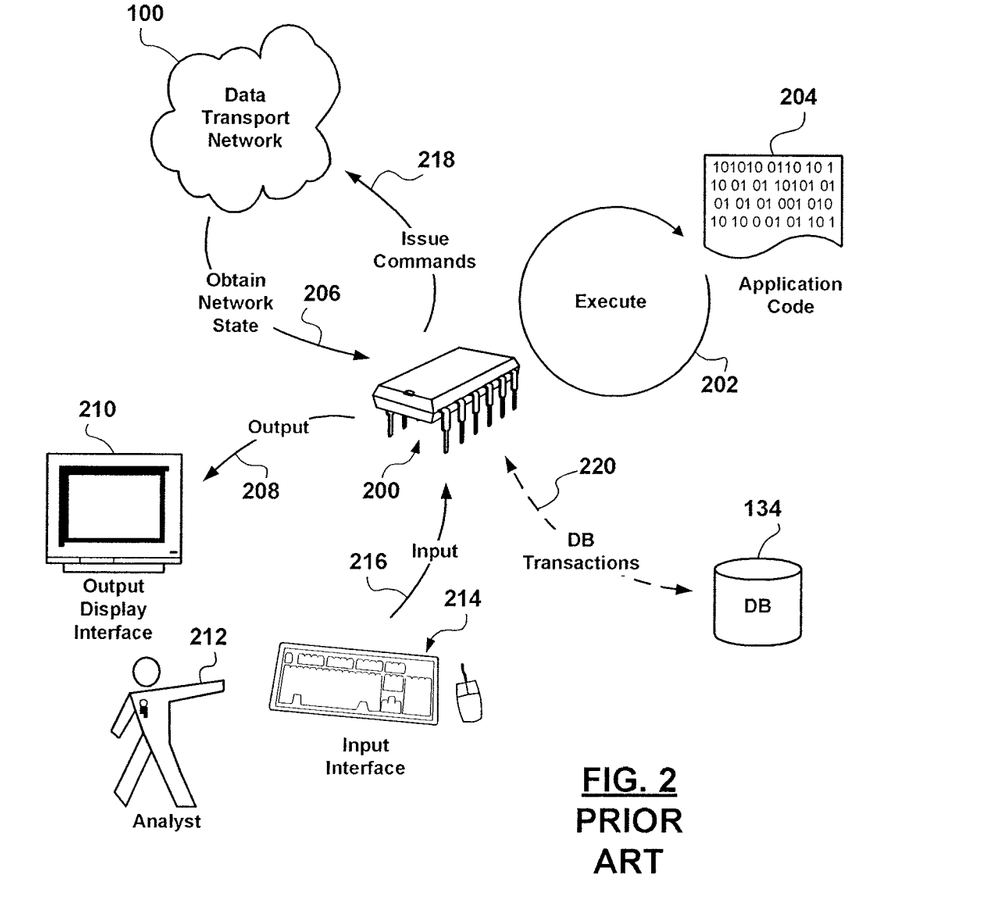
FIG. 2 is a schematic diagram of a computer executing application code in managing a data transport network and/or delivering data services.

FIG. 2 is a schematic diagram of a computer executing application code in managing a data transport network and/or provisioning data services.

The computer, making use of a processor schematically shown at 200, executes 202 a body of application code 204 to obtain 206 a data network state of the data transport network 100. The current state of the data transport network 100 and/or the supported services are displayed 208 on a display interface 210 for analysis by an analyst 212. The analyst 212 uses an input interface 214 such as, but not limited to, a keyboard and a pointing device to specify 216 commands to be issued 218 to data network equipment in the data transport network 100 to effect a change in the state of the data transport network 100.

The computer using processor 200 may, in the process of displaying a current data network state and/or in the process of issuing commands to the data transport network, transact 220 with other data network nodes providing data network management services such as a database 134.

At a typical hub 132, legacy software application code and current software application code is run on legacy and current computers in combination to provide network management and service provisioning solutions. There are various ways of achieving the running of legacy and current software application code in combination.

Figure 3:
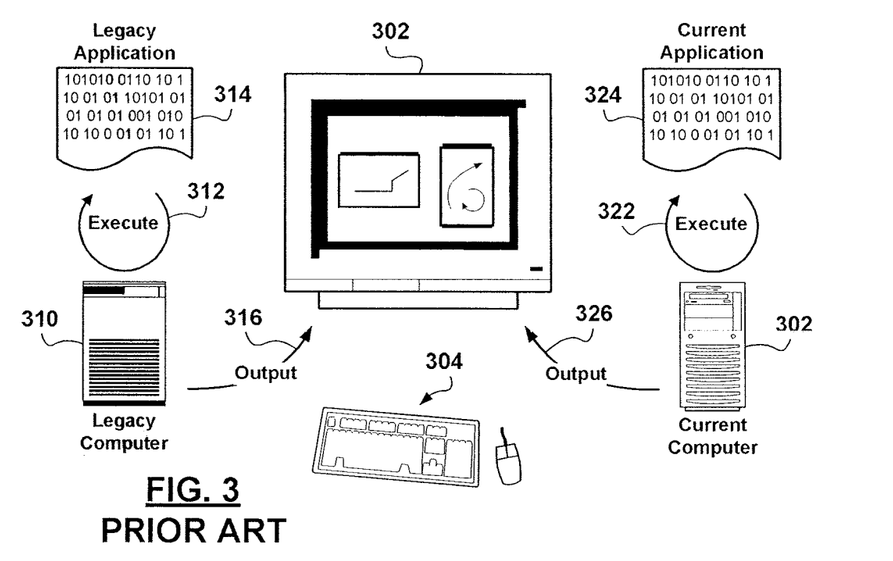
FIG. 3 is a schematic diagram showing details of a management and data service provisioning environment facilitating the presentation of a current data network state and providing an interaction therewith.

FIG. 3 is a schematic diagram showing details of a network management and service provisioning environment facilitating the presentation of a current data network state and providing an interaction therewith.

A legacy computer 310 executes 312 legacy software application code 314 and outputs to an interface including a display interface 302 and an input interface 304. A current computer 320 executes 322 current software application code 324 and outputs to the same interface.

The network management and service provisioning solution may be provided such that legacy 314 and current 324 application code is run on the same computer. This arrangement may not always be viable. Legacy computers 310 are typically short on resources although providing unique features; while current computers 320 are typically resource rich at reduced costs and typically featureless.

In providing a data network management and data service provisioning solution, the simultaneous display of the output generated by the legacy software application code 310 and the current software application code 320 enables a consolidated view of a then current data network state. Running on different computers 310, 320 the legacy 314 and current 324 applications are "not aware" of each other. The data network state is only apparent to the analyst 212 because of the combined output displayed on the common display interface 302. In making reference to application code "not being aware" of other application code, it is understood that the combination of application code does not have facilities for interaction therebetween including a lack of facilities for information exchange.

In providing a data network management and/or a service provisioning solution using a combination of application code, and due to the lack of information exchange facilities between the applications 314 and 324, the analyst 212 is typically required to make repeated information entries in using applications 314, 324. The repeated information entry actions are time consuming and error prone leading to an inefficient provisioning of the solution.

A limited integration can be provided via an operating system associated with the display interface 302. Such information exchange facilities available are limited to text level "cut/copy/paste" functionality as a remedy to repeated multiple entry tasks. Although somewhat helpful, the available information for cut/copy/paste is limited to displayed information which leads to an information exchange having a very shallow scope. Further, these facilities are not adequate, as it is typically the case, when the multiple entries, although pertaining to the same information, do not have the same data entry format (e.g. date/time formats, units of measure, etc.)

A remedy to the lack of awareness includes extending the legacy software application code 314 to include the features of the current software application code. As pointed out above, the legacy software application code 314 may have been developed specifically for the legacy computers 310. In some cases the legacy software application code 314 was designed pushing the legacy computers 310 to their performance limits; therefore extending the legacy software application code 314 to include the new features would severely affect the performance thereof. Typically legacy code is regarded as stable leading to a reluctance to fix that which is not broken. Further, using this approach would not provide a long term solution since new features are demanded on a continuing basis by market drivers.

Another remedy to the lack of awareness includes the re-coding of the legacy software application code 314 to execute on current computers 320. As pointed above, the legacy software application code 314 may have been developed specifically for the legacy computers 310 taking advantage of specific features of the legacy computers 310; the current computers 320 although superior in may ways may not necessarily have the specific features to enable the legacy software application code 314 to efficiently execute 322 thereon. As such, the legacy software application code 314 would need to be reengineered for the current computers 320 at considerable cost. Once again using this approach does not provide a long term solution as computers are under an ongoing development and as new computers become available the re-coding would have to be undertaken again.

There therefore is a need to provide integration between legacy and current software application code, to increase the efficiency in using application code in combination providing data network management and service provisioning solutions.

SUMMARY OF THE INVENTION

In accordance with an aspect of the invention, a network management and service provisioning environment is provided. At least two software applications participate in the network management and service provisioning environment running in combination on at least one computer. Each one of the two software applications further have an application code stub used to enable information exchange between the software applications. At least one human-machine interface associated with the at least one computer is used for displaying a data network state. A distributed interworking layer is formed between the application code stubs to provide an integrated network management and service provisioning solution providing an interaction with the data network state via the human-machine interface.

In accordance with another aspect of the invention, a method of participating in a network management and service provisioning environment is provided. The method includes a sequence of steps. A software application registers with a registry. The software application receives a list of prior registered software applications already participating in the network management and service provisioning environment from the registry. The software application further receives interworking specifications associated with at least another one software application in the list of prior registered software applications. Access is provided, via interaction with the newly registered software application, to functionality specified via the interworking specifications to create an interworked network management and service provisioning environment.

In accordance with a further aspect of the invention, a method of enabling a network management and service provisioning environment is provided. The method includes a sequence of steps. A software application is registered with a registry. The registry supplies the newly registered software application with a list of prior registered software applications already participating in the network management and service provisioning environment. The registry further supplies interworking specifications associated with at least another one software application in the list of prior registered software applications to the newly registered software application. Access to functionality specified via the interworking specifications is enabled via interaction with the newly registered software application thereby providing an interworked network management and service provisioning environment.

In accordance with a further aspect of the invention, a method of exchanging information between software applications in a network management and service provisioning environment is provided. The method includes a sequence of steps. At least one iconical representation of a data network entity displayed in conjunction with a first software application is selected. At least one object identification (objectID) associated with the selection is extracted. The at least one objectID is conveyed to a second software application. And, using the conveyed objectID, at least one parameter specifier associated with the second application is populated. The exchange of objectID information facilitates an integrated network management and service provisioning environment.

The information exchange may further extract at least one parameter value associated with the selection. The at least one parameter value is conveyed to the second application. And, the at least one conveyed parameter value is used to populate at least one parameter specifier associated with the second application. The exchange of the at least one parameter value further facilitates the integrated network management and service provisioning environment.

The advantages are derived from a data network and service management solution integration provisioning the exchange of information between enabling applications. A combination of application code may be executed concurrently and the man-machine interface is integrated to provide a seamless object selection, property cut, property copy, property paste, etc. functionality. The solution integration further provides distributed application launching, secure user authentication and authorization, secure interaction via the man-machine interface including the enforcement of scope of command and span of control.

BRIEF DESCRIPTION OF THE DRAWINGS

The features and advantages of the invention will become more apparent from the following detailed description of the preferred embodiments with reference to the attached diagrams wherein.

It will be noted that in the attached diagrams like features bear similar labels.

DETAILED DESCRIPTION OF THE EMBODIMENTS

Figure 4:
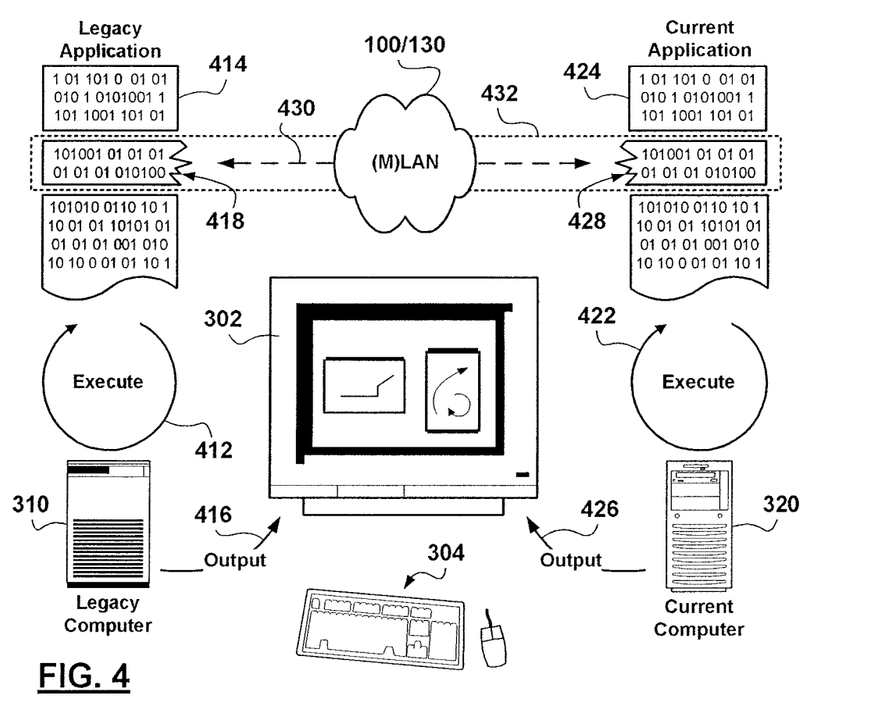
FIG. 4 is a schematic diagram showing, in accordance with a preferred embodiment of the invention, a detail of a network management and data service provisioning environment facilitating the presentation of a current data network state and providing an interaction therewith.

FIG. 4 is a schematic diagram showing, in accordance with a preferred embodiment of the invention, a detail of a network management and data service provisioning environment facilitating the presentation of a current data network state and providing an interaction therewith.

In accordance with a preferred embodiment, legacy software application code 414 is augmented with a code portion 418, as well current software application code 424 is augmented with a code portion 428. The application code change via the augmentation of at least one code portion (418/428) is performed only once per application to include provisions for information exchange 430.

The one time augmentation of the existing (current and legacy) application code with code portions 418/428 removes the necessity of future re-coding thereof. In accordance with the invention, a process of development of new application code includes requirements for the support of an interworking layer 432 to enable the information exchange 430.

The execution 412 of the legacy software application code 414 includes the execution of the code portion 418 and generates an output 416. The execution 422 of the current software application code 424 includes the execution of the code portion 428 and generates an output 426.

In accordance with an implementation of the invention, the code portions 418 and 428 make use of MLAN 130 resources to enable the information exchange 430 thereby creating the interworking layer 432. The interworking layer 432 provides an interworking functionality between applications 414/424 used in combination to provide network management and service provisioning solutions.

Methods of information exchange include, but are not limited to: peer-to-peer information exchange, broadcast information exchange, client-server information exchange, etc. A network security server 570 is shown in FIG. 5.

The methods of information exchange further include the exclusive or in-combination use of: encapsulation of information in exchanged messages, Remote Procedure Calling (RPC), Distributed Component Object Modeling (DCOM), Common Object Request Broker Architecture (CORBA), Java™'s Remote Method Invocation (RMI), etc. in creating a Distributed Computing Environment (DCE).

The analyst 212 interacts with the integrated environment via iconical elements displayed on the display interface 302 through context specific point-and-click actions associated with the input interface 304. The invention is not limited to the mode of interaction mentioned above. Other interaction modes of interaction may be used exclusively or in-combination including the use of: special purpose key sequences entered via the input interface 304, a special purpose input interface 304 including a keyboard having action specific keys, a voice command interface (not shown), etc.

Figure 5:
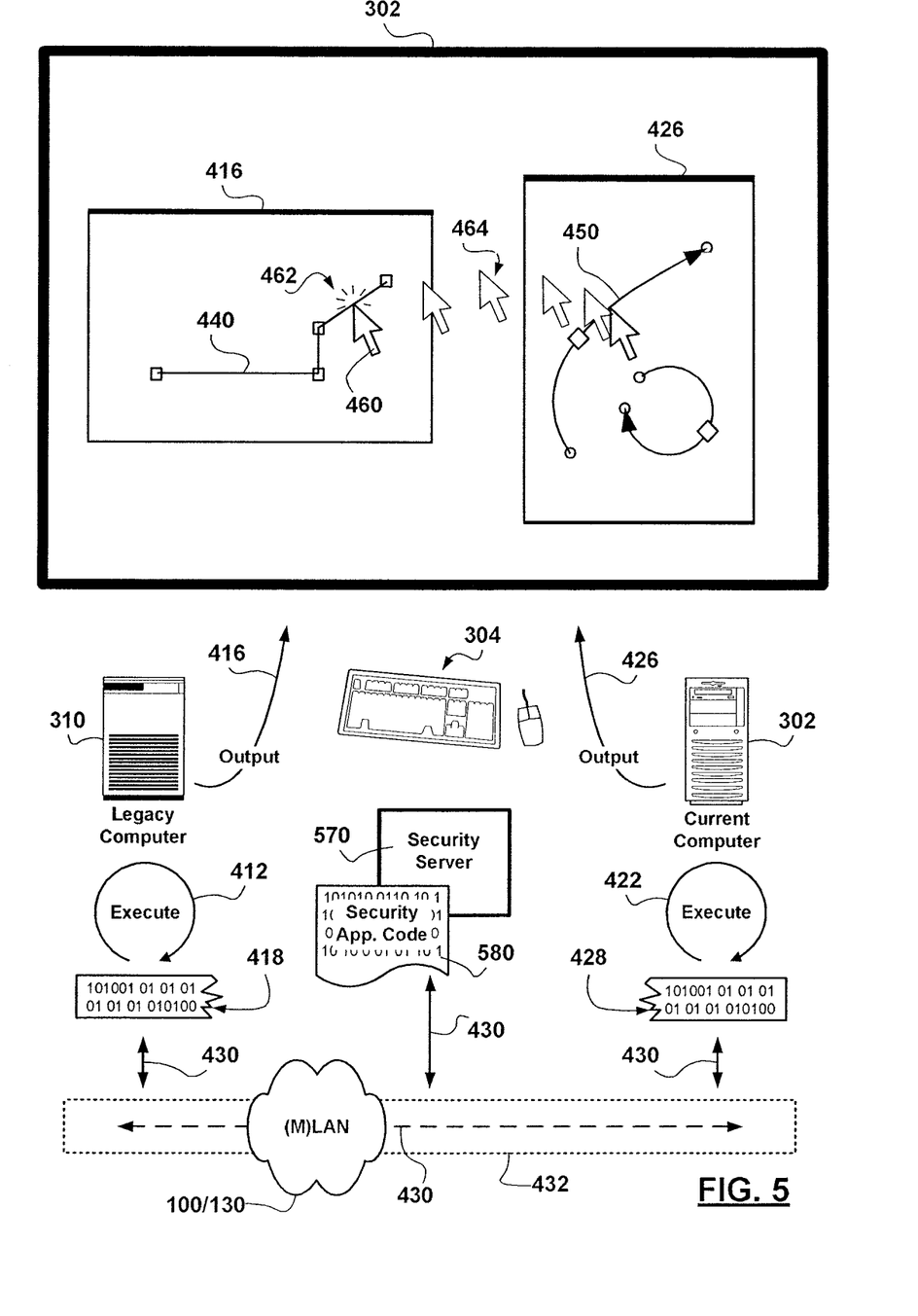
FIG. 5 is a schematic diagram showing a detail of the interaction with the integrated management and data service provisioning environment in accordance with a preferred embodiment of the invention.

FIG. 5 is a schematic diagram showing, in accordance with a preferred embodiment of the invention, a detail of the interaction with the integrated network management and data service provisioning environment.

In accordance with the preferred embodiment of the invention, each data network entity including but not limited to:

node (switching node, aggregation node, deaggregation node, bridge, router, service provider node, service user node, etc.); component (shelf, interface card, port, etc.); device (database, server, firewall, etc.); data link; data path; virtual circuit; virtual router; etc., bears a unique object identifier (objectID).

In accordance with an exemplary operation: the legacy software application code 414 is a data network management application enabling the physical establishment of data links such as data link 440 in the data transport network 100 and the current software application code 424 is a data service provisioning application enabling the establishment of data service connections 450 in the data transport network 100. A variety of iconical elements are used to facilitate an efficient display of information to the analyst 212.

Using the pointing capabilities 460 of the input interface 304, the data link 440 is selected 462. Information is extracted in executing 412 the code portion 418 including at least objectIDs of the data network nodes associated with the data link 440. The extracted information may also include parametric values associated with the selected data link 440. The extracted information is exchanged 430 with the code portion 428 of the current software application code 424. The execution 422 of the code portion 428 makes use of the provided objectIDs associated with the data link 440 and any other parametric values provided in establishing the data service connection 450. Making use of the parametric values provided may require applying a transformation to the parametric values such as, but not limited to: parameter unit transformation, time conversion, etc.

The exchanged objectID information may either be self sufficient or may be used to derive further information about the data network nodes associated with the data link 440 necessary in establishing the data service connection 450. As would be apparent to a person of ordinary skill in the art, the derivation of the necessary information may include database 134 dips and/or query-response message exchanges with the data network nodes specified via the provided objectIDs, but is not limited thereto.

The objectID exchange between the code portions 418 and 428 may not be evident to the analyst 212. The analyst 212 subsequent to making the selection 462, for example drags 464 the iconical representation of the data link 440 over to the window 426 to effect the setup of the data service connection 450.

The establishment of the data service connection 450 may or may not require auxiliary actions to be performed by the analyst 212 via the input interface 304 such as but not limited to: data throughput capacity entry, data transport jitter bounds, data transfer delay, etc.

In accordance with a preferred embodiment of the invention, secure access is integrated across all computers participating in the network management and service provisioning environment, and provided via the interworking layer 430. The integration makes use of the security server 570. All analyst 212 actions are subject to a predefined scope of command and a span of control.

On interacting with the network management and service provisioning environment, the analyst 212 authenticates with the security server 570 and the analyst 212 is subsequently authorized to perform a specific set of actions defining the scope of command—the actions being allowed on specific data network entities at specific times under a specific set of conditions defining the span of control.

Security administration may be provided via an application participating in the network management and service provisioning environment via the interworking layer 430. Access to security administration may be provided via the interface 302 as will be shown below with reference to FIG. 7.

In accordance with an embodiment of the invention, a record of applications and available capabilities associated thereto is kept for the hub 132.

Figure 6:
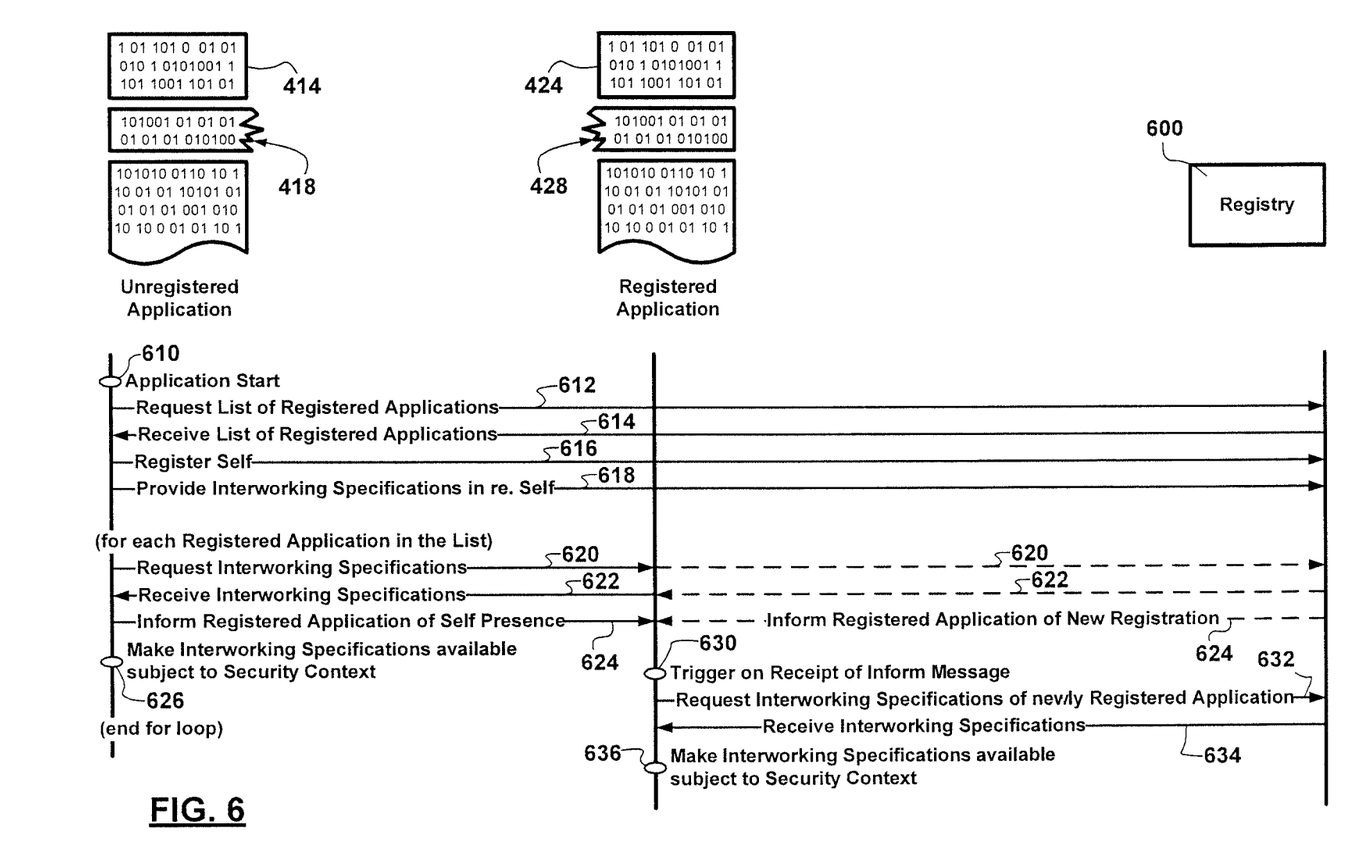
FIG. 6 is a schematic diagram showing exchanged messages in enabling the interworking layer in accordance with an exemplary embodiment of the invention.

FIG. 6 is a schematic diagram showing, in accordance with an exemplary embodiment of the invention, exchanged messages in enabling the interworking layer.

In accordance with the exemplary embodiment of the invention, a registry 600 is used to keep record of applications participating in the network management and service provisioning environment. The registry may also keep record of available capabilities provided via the participating applications.

During an exemplary operation, the legacy application 414 is unregistered with the registry 600 while the current application 424 is registered with the registry 600.

In accordance with the invention, as the analyst 212 runs the unregistered application 414 in step 610, the application 414, via the code portion 418, requests 612 from the registry 600 a list of registered applications. In step 614, the application 414 receives the list of registered applications including application 424. Subsequent to the receipt 614 of the list of registered applications from the registry 600, the application 414 registers itself, in step 616 and provides a group of interworking specifications detailing capabilities provided by the application 414.

For each registered application in the list received in step 614, including the application 424, the application 414 requests, in step 620, corresponding interworking specifications and receives these in step 622.

Each registered application in the list is informed of the invocation of the application 414 in step 624. The capabilities detailed in the interworking specifications received in step 622 are made available (626) for invocation via the application 414 (subject to a then current security context).

In accordance with the example, the application 424, as well as other registered applications (not shown), is informed 624 of the invocation of the application 414. The informing step 624 triggers the application 424, in step 630, to request (632) interworking specifications of the application 414 from the registry 600. The interworking specifications are received in step 634 and the capabilities of the application 414 are made available for invocation in interacting with the application 424 in step 636.

In accordance with the invention, the above presented sequence of events and the registry 600 enables participating applications 414/242 to act as a plug-in applications to the network management and service provisioning environment.

The registry 600 may be implemented in numerous ways without departing from the spirit of the invention. For example, the registry 600 may be implemented as a persistence entity including: a data structure, a simple file, a registration server, etc.

The registry 600 implemented as a data structure would be associated with one of the participating software applications participating in the integrated network management and service provisioning environment.

The registry 600 implemented as a registration server may inform (624) all registered applications (424) of the newly registered application 414. The registry 600 may hold only registered applications specifications while the interworking specifications are to be exchanged directly between registered applications themselves. The sequence of exchanged messages may be changed.

Figure 7:
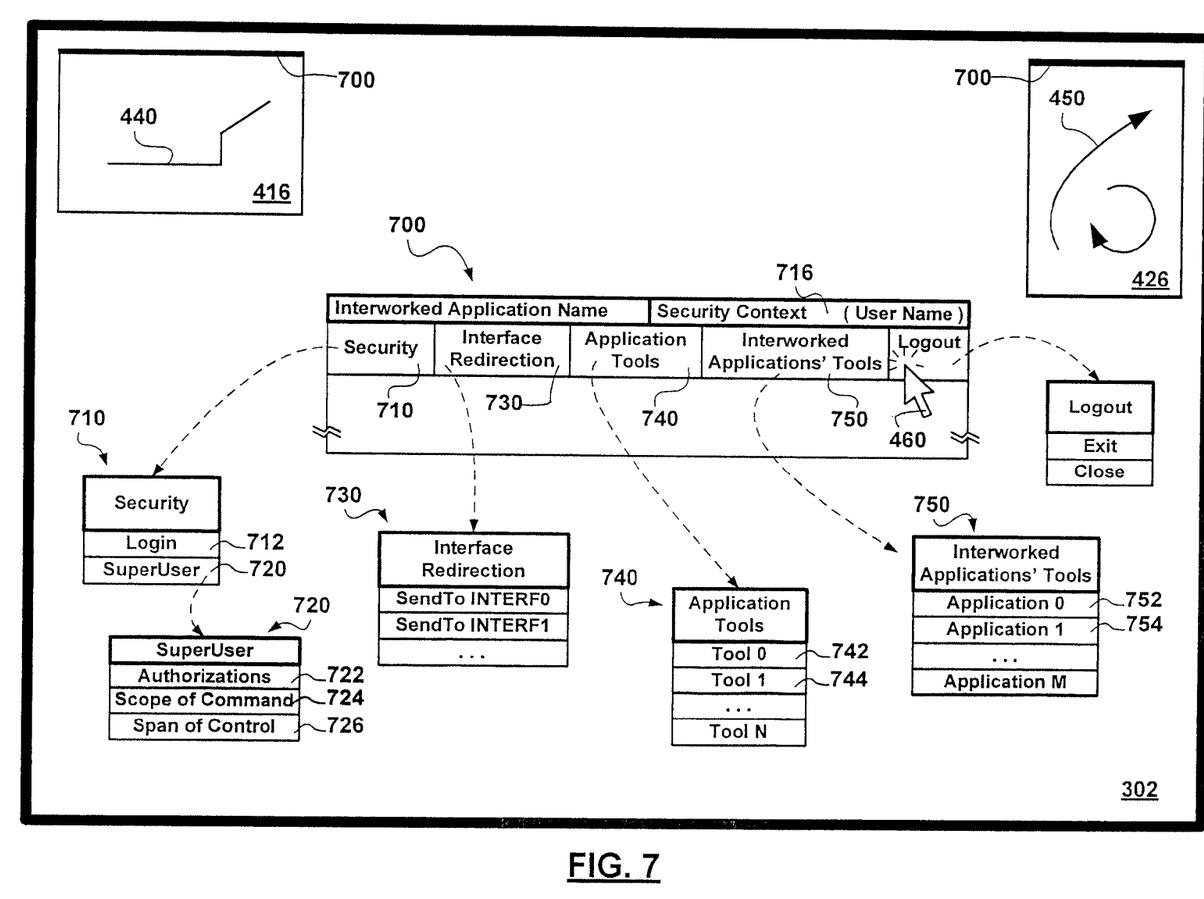
FIG. 7 is a schematic diagram showing another detail of the interaction with the integrated management and data service provisioning environment in accordance with a preferred embodiment of the invention.

FIG. 7 is a schematic diagram showing another detail of the interaction with the network management and data service provisioning environment in accordance with a preferred embodiment of the invention.

An exemplary implementation of a mode of interaction with the integrated environment is show to include an application toolbar 700 including a group of selection menus. The implementation is not limited to the use of menus—other iconical elements such as: pop-up menus, buttons, sliders, check boxes, etc. may be used to provide an intuitive interface. The process presented above in FIG. 6 synchronizes all toolbar menus 700 for each application 414/424 as shown in the corresponding output 416/426.

To facilitate the integrated environment, the application toolbar 700 is provided with a security menu 710. The security menu 710, when selected, provides access to login facilities 712. As application code 414/424 is run on different computers 310/320 the analyst 212 is required to authenticate with the integrated environment. The analyst authentication may be provided either exclusively or in-combination via security server 570 and/or security application 580. The analyst is authenticated with each application 414/424 and/or computer 310/320 either by default or on a need-to-access basis as the analyst 212 accesses capabilities provided by applications 141/424 running thereon.

The application toolbar 700 may include a security context field, such as shown at 716, specifying the analyst 212 whose scope of command and span of control is used in interacting with the integrated environment.

Other application toolbar 700 selections include logout facilities via which the analyst may either exit the application whose toolbar menu 700 is actively used or to close all the applications 414/424 actively used by the analyst 212 thus ending the interaction with the integrated environment.

Another security menu 710 selection includes a superuser selection 720. The superuser selection 720 requires a higher level authentication perhaps via additional userID and password. The superuser authentication, besides establishing the identity of an analyst 212, facilitates access to a group of actions enabling security administration.

Once authenticated as the superuser, further selections are provided, perhaps via a sub menu, for modifying authorizations 722, changing an analyst's scope of command 724, or changing an analyst's span of control 726. The authorizations selection 722 may provide for registration of new analysts 212 with the integrated environment.

Another application toolbar 700 selection includes an interface redirection selection 730 to enable the redirection of the output of applications to other display interfaces 302. The display interfaces 302 include physical displays associate with workstations 142/152, terminal 144, the advanced interface 154, etc.

A further application toolbar selection 740 provides access to capabilities provided via the application 414/424 actively interacted with. The selections 742/744 available are security context sensitive. When the analyst 212 selects a capability 724/744 for which the analyst 212 does not have the necessary authorization, access violation flags can be raised and access violation messages can be generated.

Yet another application toolbar selection 750 provides access to capabilities provided via applications (414/424) 752/754 registered with the interworking layer 430 perhaps, but not necessarily, running on different computers 310/320. The selections available are security context sensitive. When the analyst 212 selects a capability for which the analyst 212 does not have the necessary authorization, access violation flags can be raised and access violation messages can be generated.

An optimization of the use of applications 414/424 participating in the interworking layer 430 is derived from the flexibility in accessing capabilities and exchanging information.

In accordance with another method of interacting with the interworking layer 430, a group of analysts 212 interact with different application 414/424 participating in the network management and service provisioning environment enabled via the interworking layer 430. The methods presented herein provide for a consistent interface presented to each analyst 212 while the actions of each analyst 212 are subject to an individual scope of command and an individual span of control.

The embodiments presented are exemplary only and persons skilled in the art would appreciate that variations to the above described embodiments may be made without departing from the spirit of the invention. The scope of the invention is solely defined by the appended claims.

I claim:

1. A method of participating in a network management and service provisioning environment comprising steps of:
   a. registering a software application with a registry;
   b. receiving a list of prior registered software applications already participating in the network management and service provisioning environment from the registry;
   c. receiving interworking specifications associated with at least another one software application in the list of prior registered software applications; and
   d. providing access, via interaction with the newly registered software application, to functionality specified via the interworking specifications to create an interworked network management and service provisioning environment.

2. A method as claimed in claim 1, wherein the step of registering the software application with the registry further comprises a step of exchanging messages between the software application and the registry.

3. A method as claimed in claim 1, wherein prior to the step of receiving the list of prior registered software applications, the method further comprises a step of requesting the list of prior registered software applications from the registry.

4. A method as claimed in claim 1, wherein prior to the step of receiving the interworking specifications, the method further comprises a step of requesting the interworking specifications from a one of the registry and the at least another one software application participating in the interworked network management and service provisioning environment.

5. A method as claimed in claim 1, wherein the step of providing access to functionality specified via the interworking specifications further comprises a step of making available the specified functionality via interactive iconical elements associated with the newly registered software application.

6. A method as claimed in claim 1, further comprising exchanging information between software applications in a network management and service provisioning environment by:
   a. selecting at least one iconical representation of a data network entity displayed in conjunction with a first software application of the plurality of registered software applications;
   b. extracting at least one object identification (objectID) associated with the selection;

c. conveying the at least one objectID to a second software application of the plurality of registered software applications; and
d. using the conveyed objectID to populate at least one parameter specifier associated with the second application, the exchange of objectID information facilitating an integrated network management and service provisioning environment.

7. A method of exchanging information as claimed in claim 6, further comprising the steps of:
e. extracting at least one parameter value associated with the selection;
f. conveying the at least one parameter value to the second software application; and
g. using the at least one conveyed parameter value to populate at least one parameter specifier associated with the second software application, the exchange of the at least one parameter value further facilitating the integrated network management and service provisioning environment.

8. A method of exchanging information as claimed in claim 7, wherein the step of using the at least one conveyed parameter value further comprises the step of applying a transformation to the at least one parameter value.

9. A method of providing a network management and service provisioning environment comprising steps of:
a. registering a software application with a registry;
b. supplying a list of prior registered software applications already participating in the network management and service provisioning environment to the newly registered software application; and
c. supplying interworking specifications associated with at least another one software application in the list of prior registered software applications, to the newly registered software application, access to functionality specified via the interworking specifications being enabled via interaction with the newly registered software application providing an interworked network management and service provisioning environment.

10. A method as claimed in claim 9, wherein the step of registering the software application with the registry further comprises a step of exchanging messages between the software application and the registry.

11. A method as claimed in claim 9, wherein prior to the step of supplying the list of prior registered software applications, the method further comprises a step of receiving a request for the list of prior registered software applications from the newly registered software application.

12. A method as claimed in claim 9, wherein prior to the step of supplying the interworking specifications, the method further comprises a step of receiving a request for the interworking specifications from the newly registered software application.

13. A method of exchanging information between software applications in a network management and service provisioning environment comprising steps of:
a. selecting at least one iconical representation of a data network entity displayed in conjunction with a first software application;
b. extracting at least one object identification (objectID) associated with the selection;
c. conveying the at least one objectID to a second software application; and
d. using the conveyed objectID to populate at least one parameter specifier associated with the second application, the exchange of objectID information facilitating an integrated network management and service provisioning environment.

14. A method of exchanging information as claimed in claim 13, further comprising the steps of:
a. extracting at least one parameter value associated with the selection;
b. conveying the at least one parameter value to the second application; and
c. using the at least one conveyed parameter value to populate at least one parameter specifier associated with the second application, the exchange of the at least one parameter value further facilitating the integrated network management and service provisioning environment.

15. A method of exchanging information as claimed in claim 14, wherein the step of using the at least one conveyed parameter value further comprises a step of applying a transformation to the at least one parameter value.

* * * * *